United States Patent
Schliep et al.

(10) Patent No.: US 8,711,485 B2
(45) Date of Patent: Apr. 29, 2014

(54) VEHICLE DISPLAY SYSTEM OR PROJECTION DISPLAY FOR A MOTOR VEHICLE, AND CALIBRATION METHOD

(75) Inventors: Frank Schliep, Leverkusen (DE); Oliver Kirsch, Wuppertal (DE)

(73) Assignee: Johnson Controls Technology Company, Holland, MI (US)

( * ) Notice: Subject to any disclaimer, the term of this patent is extended or adjusted under 35 U.S.C. 154(b) by 275 days.

(21) Appl. No.: 13/125,783

(22) PCT Filed: Nov. 4, 2009

(86) PCT No.: PCT/EP2009/007901
§ 371 (c)(1),
(2), (4) Date: Jul. 19, 2011

(87) PCT Pub. No.: WO2010/051979
PCT Pub. Date: May 14, 2010

(65) Prior Publication Data
US 2011/0267700 A1    Nov. 3, 2011

(30) Foreign Application Priority Data
Nov. 5, 2008 (DE) .......................... 10 2008 064 589

(51) Int. Cl.
  G02B 27/14    (2006.01)
  G02B 27/01    (2006.01)
(52) U.S. Cl.
  CPC ........... *G02B 27/0172* (2013.01); *Y10S 359/90* (2013.01)
  USPC .......................................... 359/630; 359/900
(58) Field of Classification Search
  USPC .................... 359/629, 630, 631, 633, 900
  See application file for complete search history.

(56) References Cited

U.S. PATENT DOCUMENTS

| 5,734,357 A | 3/1998 | Matsumoto |
| 2002/0089224 A1 | 7/2002 | Bruck et al. |
| 2008/0165084 A1 | 7/2008 | Giegold et al. |

FOREIGN PATENT DOCUMENTS

| DE | 44 39 644 A1 | 6/1995 |
| DE | 10046019 A1 | 3/2002 |
| DE | 103 34 720 B3 | 3/2005 |
| DE | 10 2004 021 026 B3 | 9/2005 |
| DE | 10 2005 037 832 A1 | 8/2006 |
| DE | 10 2005 037 797 A1 | 2/2007 |
| DE | 10 2007 001 266 A1 | 7/2008 |
| JP | 02-299934 | 12/1990 |
| JP | 06-027407 | 2/1994 |
| JP | 2008-517309 | 5/2008 |
| WO | 2007 000178 A1 | 1/2007 |
| WO | 2008 052730 A1 | 5/2008 |

OTHER PUBLICATIONS

English Translation of the Chinese First Office Action.
International Search Report for application No. PCT/EP2009/007901 mailed Feb. 18, 2010.
Japanese Office Action dated Jan. 8, 2014.

*Primary Examiner* — Jack Dinh
(74) *Attorney, Agent, or Firm* — Fletcher Yoder P.C.

(57) ABSTRACT

A vehicle display system comprises a display device and an optical system for generating a virtual image for a user. Correction means distorts image information after the optical system is traversed to display the virtual image with reduced distortion. The optical system comprises at least one element that can be adjusted to change the position of the virtual image. Distortion resulting from adjustment of the adjustment element. The display system has a memory device for storing correction data that determine the distortion of the correction means as a function of the selected adjustment of the adjustment element.

7 Claims, 1 Drawing Sheet

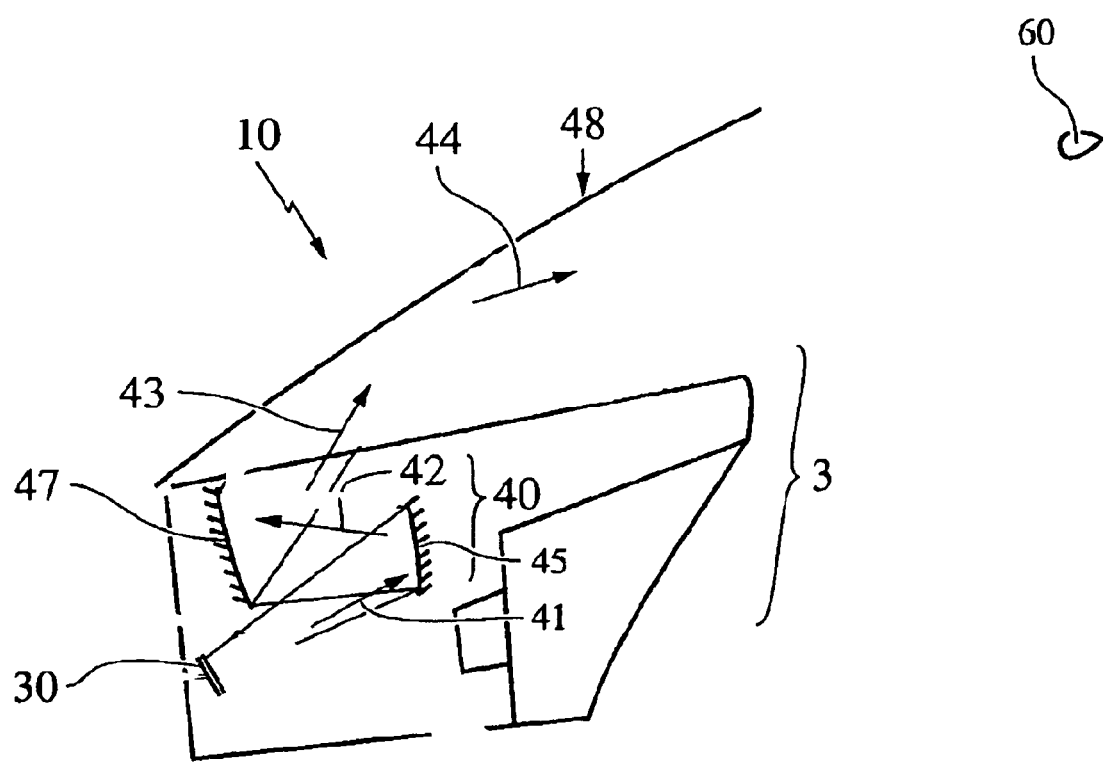

VEHICLE DISPLAY SYSTEM OR PROJECTION DISPLAY FOR A MOTOR VEHICLE, AND CALIBRATION METHOD

CROSS REFERENCE TO RELATED APPLICATIONS

This application claims priority from and the benefit of PCT Application No. PCT/EP2009/007901, filed on Nov. 4, 2009 and German Patent DE 10 2008 064 589.3, filed on Nov. 5, 2008; both entitled "Vehicle Display System or Projection Display for a Motor Vehicle, and Calibration Method", which are herein incorporated by reference.

BACKGROUND

The invention relates to a vehicle display system or a projection display for a motor vehicle and a display device, which system or device is designed as a so called head up display (HUD), that is to say in the case of which an image generator, a reflection means and a projection surface cooperate, in particular the projection surface being provided separately from the remaining, structurally combined components of the display device. The working principle is that an image generated by the image generator is passed on via one or more reflection means serving for the deflection to the projection surface that can be designed as an area of the windshield pane.

When the aim is to be able to adjust the projection onto the windshield pane, the problem arises of image distortions that are caused by the curvature (spatially variable if appropriate) of the windshield pane, or by manufacturing or assembly-related tolerances and that cannot be taken into account as early as when designing the display. With increasing richness of a detail in the information display, there is a growing need to remove these image distortions as a function of the adjustment of the projection onto the windshield pane. Publication DE 100 46 019 A1 has already disclosed a method and a device for displaying image elements composed from computer generated pixels and reflected at a curved reflection surface, in particular a windshield pane of a vehicle. It is disadvantageous here that there is an unfavorable need to arrange a camera device in the area of the viewer or user of such a display device.

SUMMARY

One object of the present invention is therefore to provide an improved vehicle display system, restrictions and/or impairments of comfort in the area of a user or viewer being avoided as far as possible, and the aim being in addition that the vehicle display system also be capable of being produced favorably in terms of costs.

The object is achieved, in particular, by a vehicle display system having a display device and having an optical system for generating a virtual image for a user, in which in order, after the optical system has been traversed, to display the virtual image with a reduced distortion use is made of a correction means to distort image information, the optical system furthermore having at least one element that can be adjusted in order to change the position of the virtual image, the distortion being provided as a function of the adjustment of the adjustable element, and the vehicle display system having a memory device for storing correction data that determine the distortion of the correction means as a function of the selected adjustment of the adjustable element.

Consequently, according to the invention a vehicle display system is proposed that has a mobile reflection means (adjustable element), for example a mirror by means of which the projection surface can be adjusted variably, as well as a correction means that can be used to compensate aberrations perceptible on the projection surface (for example in the course of predistortion when generating images, or via an optical element located in the beam path), the action of the correction means being variable, and parameters that influence action being determined for the correction means by a measurement method. In this process, measurements are carried out for a plurality of positions of the reflection means, and thus of a number of locations of the projection surface, and the correction parameters determined are stored in a memory assigned to the display device. The measurements can be carried out by using a height adjustable camera that represents various head positions of motor vehicle drivers and are contingent on body size or seat adjustment. In this way, an individually adjustable projection display system for a vehicle is demonstrated that exhibits aberration compensation which varies as a function of adjustment, such as those occurring individually in a vehicle owing to fabrication spread, for example, the determination and storage of the correction parameters advantageously already going ahead during vehicle production.

According to the invention, it is particularly preferred when the change in position of the virtual image is a change in the virtual image along a vertical axis. It is possible hereby in a simple way to attain an adaptation in the height of the virtual image in order to adapt to different positions of the eyes of the driver and/or user of the vehicle display system (caused, for example, by different body size and/or body posture).

Furthermore, it is preferred according to the invention that the change in position of the virtual image is a change in the virtual image along a vertical axis and a horizontal axis. It is possible hereby to use simple means in order to attain even greater flexibility of the positioning of the virtual image, and thus to contribute to an increase in comfort.

Furthermore, it is preferred according to the invention that a sensor means be provided for detecting the viewing position of the user. Advantageously, it is possible according to the invention to determine this viewing position and to undertake to adapt or adjust the vehicle display system to different positions, for example of a user's head. In this way, aberrations occurring on the basis of the distortion characteristics of the optical system, which depend on the head position, that is to say which depend, in particular, on the viewing angle, can be compensated particularly effectively by means of the correction data adjusted in advance (and as a function of the height adjustment of the vehicle display system, and/or as a function of the height adjustment and lateral adjustment of the vehicle display system). The determination of the head position or eye position of the user can be performed according to the invention either passively or else actively. A passive determination of the head position is, for example, possible by inspecting the image supplied by the detection device or the camera for the relative position of a pattern that is identified from geometry and contrast as a part of the face of the user, in particular as an eye. Alternatively, or cumulatively in relation to such a passive determination of the head position, it is also possible according to the invention to perform the determination of the head position actively, for example by shining an IR light source onto the viewer or the driver, such a procedure resulting in reflected light that is caused by the eye and can easily be detected on the image recorded by the camera. Furthermore, an alternative use of the camera as a means of observing the driver can be regarded as an additional advantage of such a sensor means. Particularly in the case of a measurement technique tuned to infrared light, the occurrence of fatigue indications, for example slowed down blinking or characteristic eye movements, can be detected by the camera when a target surface is not inserted into the beam path. It is then possible, if appropriate, for the imaging element to generate optical warning signs, and for said signs to be brought to the attention of the driver. Consequently, owing to the determination of the head position or eye position of the user it is advantageously possible according to the invention to, for example, reduce a risk to the user from falling asleep during an overtired state, because the conclusion that said user is or has fallen asleep can be drawn on the basis of a detected specific change in position of his head. According to the invention, it is therefore also possible to reduce the risk to the user from falling asleep by means of detecting the eye movement, the eye position and/or detecting the closing of the eyelids, for example by optimally adjusting an existing head rest as a result. According to the invention it is provided as an alternative in the absence of such a sensor means that the user manually adjust the height adaptation functionality of the vehicle display system (and/or the functionality of height adaptation and lateral adaptation provided by the vehicle display system).

Furthermore, it is preferably provided according to the invention that the adjustable element is a movable mirror element, in particular a rotationally movable minor element, and/or a mirror element capable of translational movement. It is thereby possible to implement the variation of the position of the virtual image mechanically in a simple and robust fashion.

In accordance with the present invention, it is, moreover, preferred that in order to generate the virtual image it is provided to project onto the windshield pane an item of image information originating from the display device, the distortion of the virtual image caused by a reflection at the windshield pane and the distortion caused by the correction means substantially canceling one another out.

According to the invention, it is particularly preferred that a change in the display of the display device is provided in order to bring about the distortion of the correction means, and/or in that a change in the distortion characteristic of the optical system, in particular a change in the contour of an optical element and/or a minor and/or a lens, is provided in order to bring about the distortion of the correction means. The distortion can be corrected in a particularly simple way hereby.

A further subject matter of the present invention relates to a method for calibrating an inventive vehicle display system, a detection device being used to measure the distortion of the virtual image for different positions of the virtual image, and in a way derived therefrom position dependent correction data are determined for adjusting correction means and are stored in the memory device of the vehicle display system.

DRAWINGS

The invention is explained in more detail below with the aid of exemplary embodiments illustrated in the drawing, in which FIG. 1 is a schematic of an inventive vehicle display system.

DETAILED DESCRIPTION

FIG. 1 is a schematic of an embodiment of an inventive projection system 10 or a vehicle display system 10 in the form of a sectional illustration. The vehicle display system 10 comprises a display device 30, an optical system 40. According to the invention, a light source (not illustrated) is provided, in particular, for the purpose of illuminating the display device 30. A light-emitting diode (high performance light-emitting diode) or a plurality of light-emitting diodes (diode array or diode panel) can be provided as light source. The light source 20 can either be a part of the vehicle display system 10, or else be provided separately therefrom. The first step is for light bearing or containing information from the display device 30 to be emitted in a first direction 41. According to the invention, the light emitted in the first direction 41 or the light propagating in the first direction 41 is, in particular, multiply deflected by the optical system 40. Provided in this regard in the example illustrated in FIG. 1 is a first deflecting mirror 45 that deflects the light entering in the first direction 41 into a second direction 42. The light propagating in the second direction 42 is reflected in turn by a second deflecting minor 47 and deflected into a third direction 43. The light propagating in the third direction 43 is reflected, in turn, by a windshield pane 48 and deflected into a fourth direction 44. Here, the fourth direction 44 is directed to the eye of the viewer 60. The inventive display device generates for the viewer 60 a virtual image that is superposed on the scene outside the vehicle that is viewed through the windshield pane. It is thereby possible to use the virtual image to enable the user to inform himself of specific information, particularly that relating to the driving state of the vehicle, without distraction, in particular without the need to look away from the scene outside, because of the fact that this information is displayed by means of a virtual image.

The second deflecting mirror 47 is designed as a so called adjustable element 47 in the context of the exemplary embodiment illustrated in FIG. 1. This means that a change in the adjusted height of the virtual image can be undertaken by moving the adjustable element 47. However, according to the invention it is likewise possible for the first mirror or the first deflecting minor 45 to be designed as an adjustable element 47. However, the adjustable element 47 is always denoted below by the reference numeral 47. In the context of the present invention, an adjustable element 47 is to be understood as any element of the optical system 40, or else of the display device 30, that allows the virtual image to be projected by adapting the height (or adapting the height and lateral position) of the virtual image either by differential projection (that is to say projection performed at different angles, for example) onto the windshield pane, and/or by projection that is ("unchanging", that is to say performed at the same angle) onto different areas of the windshield pane.

As a rule, different adjustments of the adjustable element 47 require the undertaking on the projected image of different corrections that are brought about by a correction means as part of the optical system 40. The different adaptations and/or corrections to be undertaken for different adjustments of the adjustable element 47 are stored as correction data in a memory device of the vehicle display system. For example, it is possible to store a plurality of sets of correction data for different discrete adjusted positions. Depending on which of the discrete adjusted positions of the adjustment element 47 (and thus of which of the accessible or adjustable height positions (or height and lateral positions) of the virtual image) has been selected, a different set of the correction data is then used for correcting the image. As an alternative thereto, it is also possible according to the invention not to provide any discrete adjusted positions of the adjustable element 47 and thus of the virtual image, but for it to be possible to adjust the height (or the height and lateral position) of the virtual image continuously. By way of example, a plurality of correction data sets are present in the memory device, and interpolation is performed, as a function of the selected adjustment of the virtual image, between various correction data sets, or else use is made of an unchanged form of a (for example most likely relevant) correction data set (for example in the form of so called look up tables).

The correction means change the display of the virtual image. This can be done, for example, by influencing the imaging element 30 or the display device 30. To this extent, the correction means is either part of the display device 30 or the correction means influences at least the display device 30. As an alternative to a predistortion of the image information transmitted to the display device 30 for display, or of such a signal, it is also possible in accordance with the invention to provide (this not being illustrated) that the correction or distortion brought about by the correction means be carried out by influencing a controllably changeable characteristic of an element of the optical system 40. By way of example, this can be performed by exerting a controllably variable influence on the surface contour of such an element of the optical system 40, for example a mirror surface and/or a lens surface in the way that is known in astronomy in principle from the manufacture of telescopes; these alternatives need not, however, apply exclusively to exerting influence on a surface of the element in the optical system, but can also relate, for example, to transmission characteristics thereof. In accordance with the present invention, it is also possible to exert influence both on the imaging element 30 or the display device 30, and on a controllably variable characteristic of an element of the optical system 40.

LIST OF REFERENCE SYMBOLS

10 Vehicle display system/projection system
30 Imaging element/display device
40 Optical system
41, 42, 43, 44 Propagation directions of the light
45 First minor
47 Second mirror/adjustable element
60 User/user's eye

The invention claimed is:

1. A vehicle display system comprising a display device and an optical system for generating a virtual image for a user, in which in order, after the optical system has been traversed, to display the virtual image with a reduced distortion use is made of a correction means to distort image information; wherein the optical system comprises at least one element that can be adjusted to change the position of the virtual image, distortion results from adjustment of the adjustable element, and the vehicle display system comprises a memory device for storing correction data that determine the distortion of the correction means as a function of a selected adjustment of the adjustable element;
wherein the distortion of the correction means results from a change in a display of the display device and a change in a distortion characteristic of the optical system, and the change in the distortion characteristic of the optical system includes a change in the contour of an optical element, a mirror, a lens, or a combination thereof.

2. The vehicle display system as claimed in claim 1, wherein the change in position of the virtual image is a change in the virtual image along a vertical axis.

3. The vehicle display system as claimed in claim 1, wherein the change in position of the virtual image is a change in the virtual image along a vertical axis and a horizontal axis.

4. The vehicle display system as claimed in claim 1, wherein the adjustable element comprises a movable mirror element.

5. The vehicle display system as claimed in claim 4, wherein the mirror element is configured for rotational and/or translational movement.

6. The vehicle display system as claimed in claim 1, wherein the display device projects an item of information onto a windshield pane to generate the virtual image, the distortion of the virtual image being caused by a reflection at the windshield pane and the distortion caused by the correction means substantially canceling distortion of the virtual image.

7. A method for calibrating a vehicle display system as claimed in claim 1, wherein a detection device is used to measure the distortion of the virtual image for different positions of the virtual image, and position dependent correction data are derived therefrom for adjusting the correction means and are stored in the memory device of the vehicle display system;
wherein fatigue indications of the user are detected by a camera, optical warning signs are generated by the display device based on the detected fatigue indications, and the optical warning signs are brought to the attention of the driver by the display device, wherein the fatigue indications include slowed down blinking or characteristic eye movements.

* * * * *